United States Patent [19]

Karasudani

[11] 4,051,926
[45] Oct. 4, 1977

[54] DISC BRAKE

[75] Inventor: Yasuo Karasudani, Yokohama, Japan

[73] Assignee: Tokico Ltd., Kawasaki, Japan

[21] Appl. No.: 714,324

[22] Filed: Aug. 13, 1976

[30] Foreign Application Priority Data

Aug. 19, 1975 Japan .......................... 50-114178[U]

[51] Int. Cl.² ............................................. F16D 65/02
[52] U.S. Cl. ................................................. 188/73.3
[58] Field of Search ............ 188/71.3, 72.4, 73.3–73.6, 188/206 R

[56] References Cited

U.S. PATENT DOCUMENTS

| 3,532,191 | 10/1970 | Burnett et al. | 188/71.3 |
| 3,917,033 | 11/1975 | Rath et al. | 188/73.3 |

Primary Examiner—Duane A. Reger
Attorney, Agent, or Firm—Wenderoth, Lind & Ponack

[57] ABSTRACT

A disc brake including a caliper slidably supported on a stationary member by at least one axially extending pin slidably received in a guide bore, wherein a rigid cylindrical member is secured to either the caliper or the stationary member and surrounds the pin and is slidable relative to the other of the caliper and the stationary member, and a seal member is disposed to cooperate with the cylindrical member.

3 Claims, 5 Drawing Figures

DISC BRAKE

This invention relates to improvements in a disc brake of the kind in which an inner or directly actuated pad located on one side of a rotatable disc is pressed against the disc by an actuator, and an outer or indirectly actuated pad is pressed against the other side of the disc through a caliper which straddles the disc and is slidable in the direction of the axis of the disc.

In one prior art disc brake of the aforementioned kind, the caliper has a pair of pins which are spaced from each other in the direction of the circumference of the disc and which extend in the direction of the axis of the disc, and which are slidably received in guide bores, respectively, formed in a stationary member. The pads are also slidably supported on the supporting member. Rubber boots are provided for preventing ingress of water, dust or the like between the guide bores and the pins respectively. Such rubber boots, however, are disadvantageous in that when a vehicle equipped with the disc brake is running on uneven ground or a rough road, the rubber boots, due to the inherent nature of rubber, are liable to be damaged by stones, wood pieces or the like, thrown up from the road, resulting in the failure of the boots to prevent ingress of water, dust or the like.

An object of the present invention is to solve the drawback described by providing a disc brake of the aforementioned kind wherein the pin is covered by a rigid cylindrical member, and a sealing member of resilient material is disposed between the cylindrical member and the peripheral surface of a member with which the cylindrical member is maintained in slidable engaging relation.

The object and features of the present invention will become apparent from the ensuing specification in conjunction with the accompanying drawings, in which.

Figure 1:
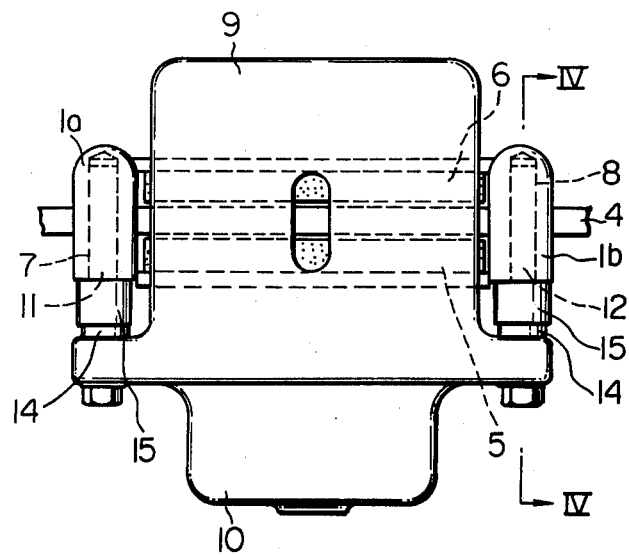
FIG. 1 is a plan view of a disc brake embodying the present invention.
Figure 2:
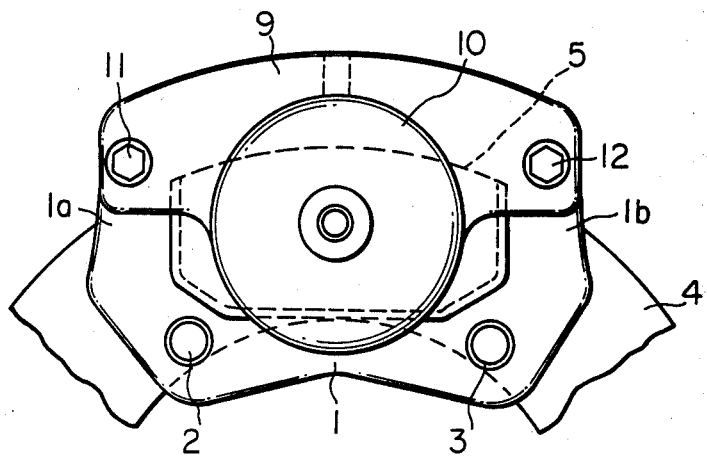
FIG. 2 is a front view of the disc brake of FIG. 1.
Figure 3:
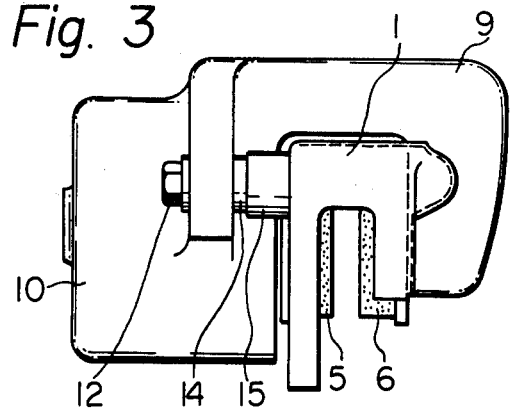
FIG. 3 is a side view of the disc brake of FIG. 1.
Figure 4:
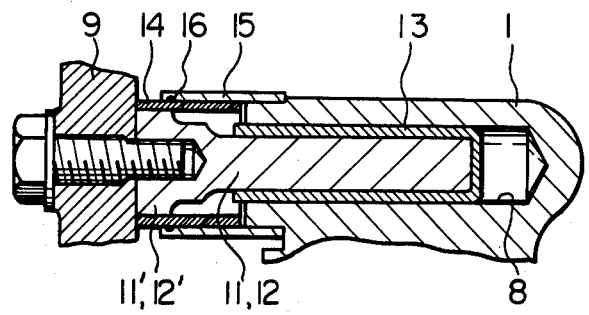
FIG. 4 is a cross-sectional view taken along the line IV—IV in FIG. 1.

Referring to FIGS. 1, 2 and 3, a generally U-shaped stationary member 1 having a pair of arms 1a and 1b on the opposite sides thereof is adapted to be secured by to bolts (not shown) passing through bolt holes 2 and 3 to a non-rotatable part (not shown) of a vehicle, such as a spindle knuckle of a MacPherson type suspension strut. A pair of pads 5 and 6 are disposed on the opposite sides of rotatable disc 4 and are slidable supported by the arms 1a and 1b of the stationary member 1 for sliding movement in the direction of the axis of the disc 4. The arms 1a and 1b of the stationary member 1 are provided with guide bores 7 and 8 extending in the direction of the axis of the disc 4. A caliper 9 incorporating an actuator 10 on one side thereof for urging the pad 5 directly against one surface of the disc 4 straddles a portion of the periphery of the disc 4 and extends to the back side of the pad 6. A pair of pins 11 and 12 extending in the direction of the axis of the disc 4 are secured to the caliper 9 and received respectively in the guide bores 7 and 8. The pins 11 and 12 are fitted in bushings 13 made of resilient material and received slidably in the guide bores 7 and 8 in the stationary member 1, respectively, as seen in FIG. 4. Either or both of the bushings 13 may be omitted so that the pin slidably engages with the guide bore, but use of at least one bushing is advantageous to allow for machining tolerances and to suppress vibration.

As is clearly shown in FIG. 4, the portions of respective pins 11 and 12 which project out of the guide bores 7 and 8 are covered by cylindrical members 14 and 15 formed of rigid material such as a corrosion resistant metal or the like. The cylindrical member 14 is rigidly secured to the corresponding one of the pins 11 and 12 at the end portion 11' or 12' adjacent to the caliper 9, and the cylindrical member 15 is rigidly secured to the stationary member 1 at the open end of the corresponding one of the guide bores 7 and 8. The cylindrical member 14 is closely but slidably fitted in the cylindrical member 15 with a seal ring 16 being inserted therebetween, thereby protecting the portions of pins 11 and 12 which project from the guide bores 7 and 8, as well as preventing, by means of the seal ring 16, ingress of water, dust or the like between the guide bores 7 and 8 and bushings 13.

Figure 5:
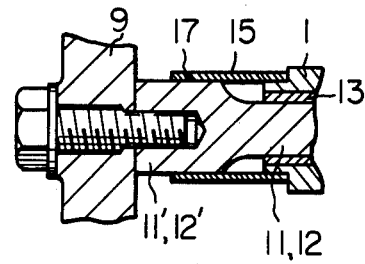
FIG. 5 is a cross-sectionl view similar to FIG. 4 of a modified disc brake.

FIG. 5 shows a modified form of the present invention. In this embodiment, the cylindrical member 14 is omitted and, in turn, respective pins 11 and 12 have diametrically enlarged end portions 11' and 12' as compared with the portions fitted in the guide bores 7 and 8, and the length of the portions 11' and 12' are increased relative to the first embodiment. The diametrically enlarged portions 11' and 12' of respective pins 11 and 12 are closely but slidably fitted in the cylindrical members 15 rigidly secured to the stationary member 1 respectively with seal rings 17 being inserted between the cylindrical members 15 and the end portions 11' and 12' of the pins respectively.

In the second embodiment, the cylindrical members 15 are secured to the stationary member. As an alternative, the cylindrical member may rigidly be secured to the end portion of the pin or to the caliper itself and, in turn, a portion of the stationary member may be given a cylindrical configuration so as to be closely but slidably received in the cylindrical member.

In short, the essence of the present invention is to provide one or more rigid cylindrical members to protect the portion of the pin which will enter into and retract from the guide bore when the caliper moves axially relative to the stationary member.

The member with which the cylindrical member is maintained in close sliding engagement is not limited to a cylindrical member, but, can be for example, an end portion of a pin as in the second embodiment, or a portion of the stationary member.

In the embodiments described, the guide bores 7 and 8 are provided in the stationary member 1, and the pins 11 and 12 are secured to the caliper 9. As an alternative, the pins 11 and 12 may be secured to the stationary member 1 and, in turn, the guide bores 7 and 8 may be provided in the caliper 9, so that the caliper is supported slidably on the stationary member 1. The pad 6 is supported slidably by the stationary member 1 in the embodiments shown (means such as axially extending grooves formed in the stationary member 1 and complementary projections formed on the pads are omitted in the drawings), but the pad 6 may be mounted on the caliper 9 as the case may be. Further, in the embodiments, the bushings 13 are fitted on the pins 11 and 12 so as to allow sliding movement of the bushings 13 in the guide bores 7 and 8. As an alternative, the bushings 13 may be fitted tightly in the guide bores 7 and 8 for allowing sliding movement of the pins 7 and 8 relative to respective bushings 13.

The disc brake according to the present invention comprises one or more rigid cylindrical members disposed between and around the pin and the guide bore which replace the rubber boots or the prior art disc brake, thereby avoiding failure of the rubber boots due to stones or the like thrown up from the road. Furthermore, the rigid cylindrical member can protect the pin from damage. The caliper is supported on the stationary member through the pins as well as the rigid cylindrical members, resulting in improved vibration resisting characteristics.

What is claimed is:

1. A disc brake comprising a stationary member secured to a non-rotatable part of a vehicle, a caliper member, at least one pin secured to one of said members and the other member having a corresponding guide bore therein in which said pin is slidably positioned for slidably supporting the caliper member on the stationary member, and a rigid sleeve is secured to said other member around the open end of the guide bore and extending in the direction of the axis of said pin and sealingly surrounding a portion of said pin projecting out of said guide bore.

2. A disc brake as claimed in claim 1 wherein there is a pair of said pins mounted on the caliper member and respective guide bores are provided in said stationary member, there being two rigid sleeves and said sleeves being secured to the stationary member around said pins, each of said pins having a large diameter portion on which a corresponding sleeve is slidably fitted, and a seal ring disposed between the inner periphery of each cylindrical member and the outer periphery of the large diameter portion of the pin.

3. A disc brake as claimed in claim 1 wherein there is a pair of pins on said caliper member and extending axially therefrom and the respective guide bores are provided in said stationary member, there being a pair of first rigid sleeves, one for each said pin and secured to the stationary member and extending axially in the direction opposite to the direction in which said pins extend, and a pair of second rigid sleeves fitted closely and slidably within the corresponding sleeves on said stationary member, and a seal ring between each of the sleeves of the slidably interfitted sleeves, said second sleeves being secured to the caliper or to the base portion of each of said pins and surrounding the corresponding pin.

* * * * *